(12) United States Patent
Müller et al.

(10) Patent No.: US 6,257,276 B1
(45) Date of Patent: Jul. 10, 2001

(54) FREELY PROGRAMMABLE POSITION INDICATING APPARATUS

(75) Inventors: Fritz Müller, Ingelfingen; Gregor Gaida, Niedernhall, both of (DE)

(73) Assignee: Gebrüder Müller Apparatebau GmbH & Co. KG, Ingelfingen (DE)

( * ) Notice: Subject to any disclaimer, the term of this patent is extended or adjusted under 35 U.S.C. 154(b) by 0 days.

(21) Appl. No.: 09/320,999

(22) Filed: May 27, 1999

(30) Foreign Application Priority Data

May 28, 1998 (DE) .......................................... 298 09 667 U

(51) Int. Cl.[7] .................................................... F16K 37/00
(52) U.S. Cl. ........................................ 137/554; 116/277
(58) Field of Search ................................. 137/554, 553; 116/277, 200

(56) References Cited

U.S. PATENT DOCUMENTS

| | | | |
|---|---|---|---|
| 4,926,903 | * | 5/1990 | Kawai .................................. 137/554 |
| 5,706,855 | * | 1/1998 | Heiniger .............................. 137/554 |
| 6,050,296 | * | 4/2000 | Hoffmann et al. ............... 137/554 X |

* cited by examiner

*Primary Examiner*—Kevin Lee
(74) *Attorney, Agent, or Firm*—Henry M. Feiereisen

(57) ABSTRACT

A freely programmable position indicating apparatus, in particular for valves, includes a movable or rotatable adjusting member, a position detection unit operatively connected to the adjusting member for continuously generating an analog output signal commensurate with an actual position of the adjusting member. The analog output signal is transmitted to an electronic evaluation unit for determining the position indication.

12 Claims, 2 Drawing Sheets

FREELY PROGRAMMABLE POSITION INDICATING APPARATUS

CROSS-REFERENCES TO RELATED APPLICATIONS

This application claims the priority of German Utility Model Application Ser. No. 298 09 667.6, filed May 28, 1998, the subject matter of which is incorporated herein by reference.

BACKGROUND OF THE INVENTION

The present invention relates to a freely programmable position indication apparatus especially but not exclusively for valves, such as diaphragm valves or the like, and including a movable adjusting member.

To date, limit switches are used for position indication, in particular in valves, such as diaphragm valves or the like, whereby the limit are mechanically interact with the adjusting member for defining the ON and OFF positions during movement of the adjusting member. Thus, a purely mechanical detection of the respective end positions of the adjusting member is realized. There are applications, however, in which the switching positions may change in dependence on the travel path of the adjusting member. An example is a diaphragm valve in which the diaphragm has a certain inherent elasticity that may vary in dependence on the material. It may also be desired to trigger certain control sequences at intermediate positions of the travel path of the adjusting member.

SUMMARY OF THE INVENTION

It is thus an object of the present invention to provide an improved freely programmable position indicating apparatus, obviating the afore-stated drawbacks.

In particular, it is an object of the present invention to provide an improved freely programmable position indicating apparatus, in particular for valves with a movable or rotatable adjusting member, which is universally usable and can be suited in a simple manner to the application at hand, while still permitting consideration of structure-based and material-based influencing variables in a simple constructive manner.

These objects, and others which will become apparent hereinafter, are attained in accordance with the present invention by providing an adjusting member, a position detection unit operatively connected to the adjusting member for continuously generating an analog output signal commensurate with a position of the adjusting member, and an electronic evaluation unit receiving the output signal for determining the position indication.

In accordance with the invention, the positions of the adjusting member are not mechanically, but electrically detected so that the position indicating apparatus, after installation, for example, in a valve, can be freely programmed, i.e. the position indicating apparatus has the capability to self-learn for detecting and determining the respectively desired positions of the adjusting member. In this manner, the position indicating apparatus according to the invention can be universally utilized in cooperation with movable adjusting members, which, optionally, may also be rotatable, whereby structure-based and/or material-based influencing variables are automatically considered by the self-learning function of the position indicating apparatus according to the invention so that the respective positions of the travel path of the adjusting member can be electrically detected and subsequently determined and stored by electronic evaluation units. Such a configuration eliminates the necessity to carry out a time-consuming fine tuning of the adjusting positions of the adjusting member so that the position indicating apparatus according to the invention has the capability to establish the desired switching positions precisely in the desired fashion. The electronic evaluation unit provided in accordance with the present invention, generates an analog output signal which is transmitted to the position detection unit and processed to determine the respective adjusting position and position indication. The freely programmable position indication apparatus according to the invention is easy to implement and requires a minimum of space, so that its installation can be realized without any problems even if only a tight space for installation is available.

According to another feature of the present invention, the position detection unit extends over the entire travel path of the adjusting member so that the position detection unit is able to continuously detect, recognize and determine the current position of the adjusting member. Thus, the entire travel path of the adjusting member can be scanned.

According to another feature of the present invention, the position detection unit generates an analog output signal which is proportional to the movement of the adjusting member. Such a configuration results in a linear correlation between the travel path of the adjusting member and the position of the adjusting member acquired by the position detection unit. Thus, the electronic evaluation unit can be significantly simplified and implemented in a more cost-efficient manner. During the programming phase, a self-learning function is realized which automatically recognizes and stores the end positions for use as switching threshold.

Suitably, the position detection unit is formed by a linear potentiometer, which, for example, may be designed in the form of the printed circuit board with ohmic layer resistivity. This printed circuit board is disposed parallel to the entire travel path of the adjusting member. Such linear potentiometers require little space in conjunction with the adjusting member arrangement and represent components which are commercially available inexpensively. It is certainly also possible to form the position detection unit by a rotary potentiometer, in the event the adjusting member executes, for example, a rotary motion for realizing the adjusting movement.

The electronic evaluation unit may include a microprocessor and a microswitch for initiating the programming. The microswitch activates the freely programmable position indicating apparatus according to the invention to initiate the self-learning function thereof. When the predetermined switching positions of the adjusting member are detected and determined during execution of the self-learning function, the switching positions can then be stored in the microprocessor and be retrieved for further processing.

According to another feature of the present invention, the electronic evaluation unit includes a light-emitting diode arrangement which serves as indicator for the operational state. With such a light-emitting diode arrangement, the operational state of the freely programmable position indicating apparatus according to the invention, can be reliably and easily recognizably displayed, for example, by means of suitable, color signal coding. In order to simplify the configuration of the position indicating apparatus according to the invention, the electronic evaluation unit is so designed that the microprocessor, the microswitch and the light-emitting diode arrangement are mounted on a common printed circuit board so that these components can be installed in a space-saving fashion.

Suitably, the electronic evaluation unit has an output which is operatively connected to at least one relay for activation thereof so as to trigger respective control functions via the relay. In particular when using the freely programmable position indicating apparatus according to the invention for a valve with an adjusting member in the form of an actuation spindle, such a valve can be activated in the desired manner by configuring the electric evaluation unit, for example, with two outputs which are operatively connected to two switching relays in one-to-one correspondence.

When using the position indicating apparatus according to the invention for a valve, such as a diaphragm valve, the adjusting member as actuation spindle is in forced engagement, for example, with a drive piston which acts upon the respectively associated valve element, such as the valve diaphragm.

Suitably, the position indicating apparatus according to the invention is so integrated as to be protected from environmental impacts so that environmental conditions, such as moisture, temperature or the like, cannot adversely affect the programming operation.

In summary, the present invention provides for a position indicating apparatus for a movable or rotatable adjusting member, which permits a freely programmable adjustment and includes a self-learning function for simplified operation. Suitably, the positions of the adjusting member along the travel path are continuously detected by the position detection unit which generates an output signal, commensurate with the position of the adjusting member, for transmission to the electronic evaluation unit to determine the respective positions. Thus, a freely programmable position indicating apparatus with mechanical, electrical and electronic evaluation logic is made available.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
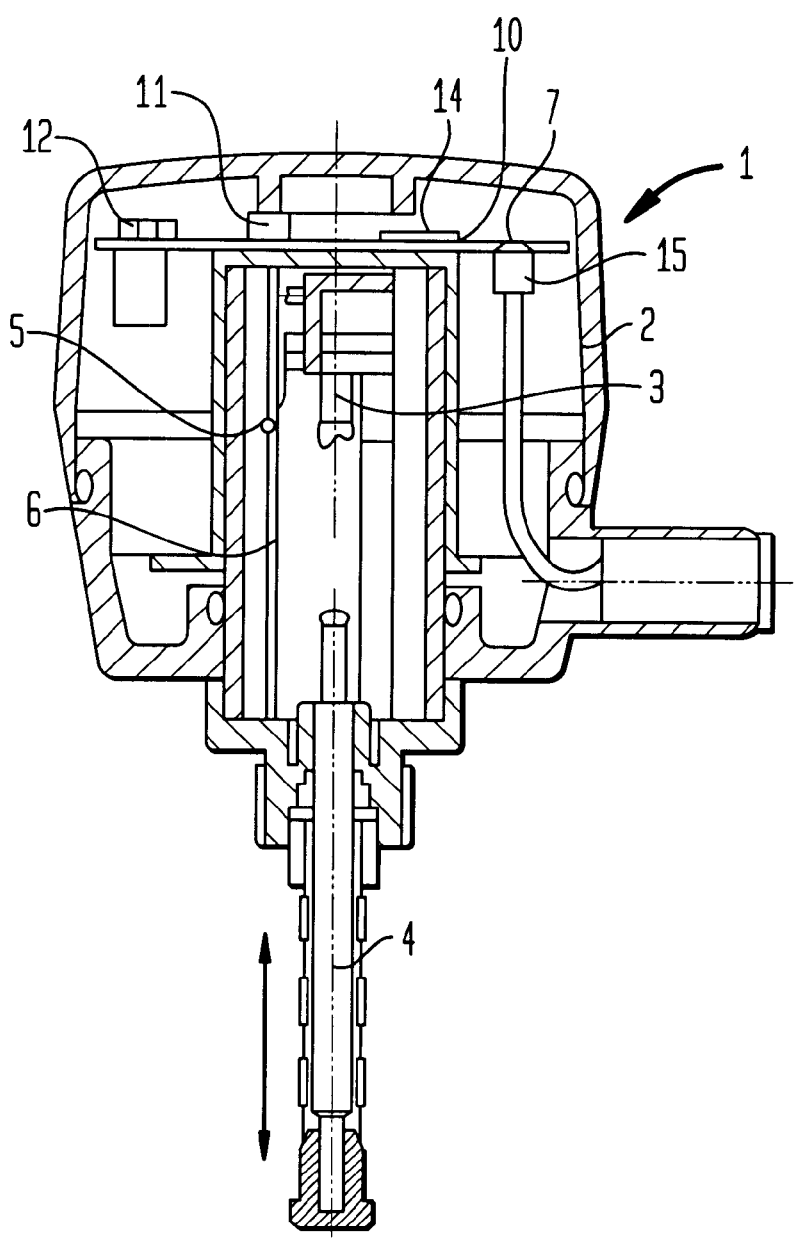
FIG. 1 is a schematic side view of an exemplified actuating device for application in a valve, having incorporated therein a freely programmable position indicating apparatus according to the present invention.

Throughout all the Figures, same or corresponding elements are generally indicated by same reference numerals.

Turning now to the drawing, and in particular to FIG. 1, there is shown a valve actuation device, generally designated by reference numeral 1 and including a movable adjusting member 3 which is received in a housing 2. In the nonlimiting example of FIG. 1, the adjusting member 3 is utilized for application in a valve, such as a diaphragm valve, and formed by an actuating spindle 4 which is in forced engagement with a drive piston (not shown) that acts on a valve element, such as a valve diaphragm, which is also not shown for sake of simplicity. In the illustrated example, the adjusting member 3 in the form of the actuating spindle 4 executes a stroke along a predetermined travel path starting from the open valve position to the closed valve position. The adjusting member 3 may, optionally, also execute a rotational movement or a swinging movement.

Provided in the housing 2 immediately adjacent the adjusting member 3 is a position detection unit 5 which, in the nonlimiting example of FIG. 1, extends along the entire travel path of the adjusting member 3. The position detection unit 5 is suitably designed as a linear potentiometer, and may be formed, for example, by a printed circuit board which is dimensioned as ohmic layer-type resistor. The position detection unit 5 generates an analog output signal for detecting the respective position of the adjusting member 3. In the event the position detection unit 5 is provided in the form of a linear potentiometer, the analog output signal is proportional to the amount of displacement of the member 3.

As shown in FIG. 1, the housing 2 accommodates a further printed circuit board 7 which supports an electronic evaluation unit 10. The evaluation unit 10 includes a microprocessor 14 and a microswitch 11 which serves, for example, to initiate the programming of a freely programmable position indicating apparatus, generally designated by reference numeral 8 and shown in more detail in FIG. 2. The electronic evaluation unit 10 may also include an array of light-emitting diodes 12 by which an operational state is indicated in conjunction with the electronic evaluation unit 10. The circuit board 7 may include one or more relays 15, 16 to serve as switching relays for activation of the valve. These relays 15, 16 are operatively connected to the output of the electronic evaluation unit 10.

The mode of operation of the position indicating apparatus 8 is as follows:

When attaching the valve actuation device 1 with the housing 2 and the adjusting member 3 onto a respectively associated valve, such as a diaphragm valve, activation of the microswitch 11 instructs the position indicating apparatus 8 to execute the self-learning function. This status can be indicated by means of the light-emitting diode arrangement 12. The adjusting member 3, i.e. the actuating spindle 4, now moves, when used for a valve, from an initial position along the entire travel path. By means of the position detection unit 5, the respective positions of the adjusting member 3 are detected and transmitted as analog output signals from the position detection unit 5 to the electronic evaluation unit 10 which carries out the corresponding evaluation via the integrated microprocessor 14. The respectively desired positions of the adjusting member 3 are stored in the microprocessor 14, and the electronic evaluation unit 10 generates respective control signals for switching the relays 15, 16 that can be used, for example, to control the valve.

After conclusion of this learning process and optional utilization of a calibrating unit 20 for calibrating the microprocessor 14, the desired preselected positions can be maintained during the subsequent normal operational state of the valve in a predetermined manner, with the light-emitting diode arrangement 12 providing a suitably display of the operational state of the freely programmable position indicating apparatus 8.

The freely programmable position indicating apparatus 8 continuously registers the position of the adjusting member 3 over the entire travel path so that the respectively desired positions of the adjusting member 3 can be reliably realized.

Figure 2:
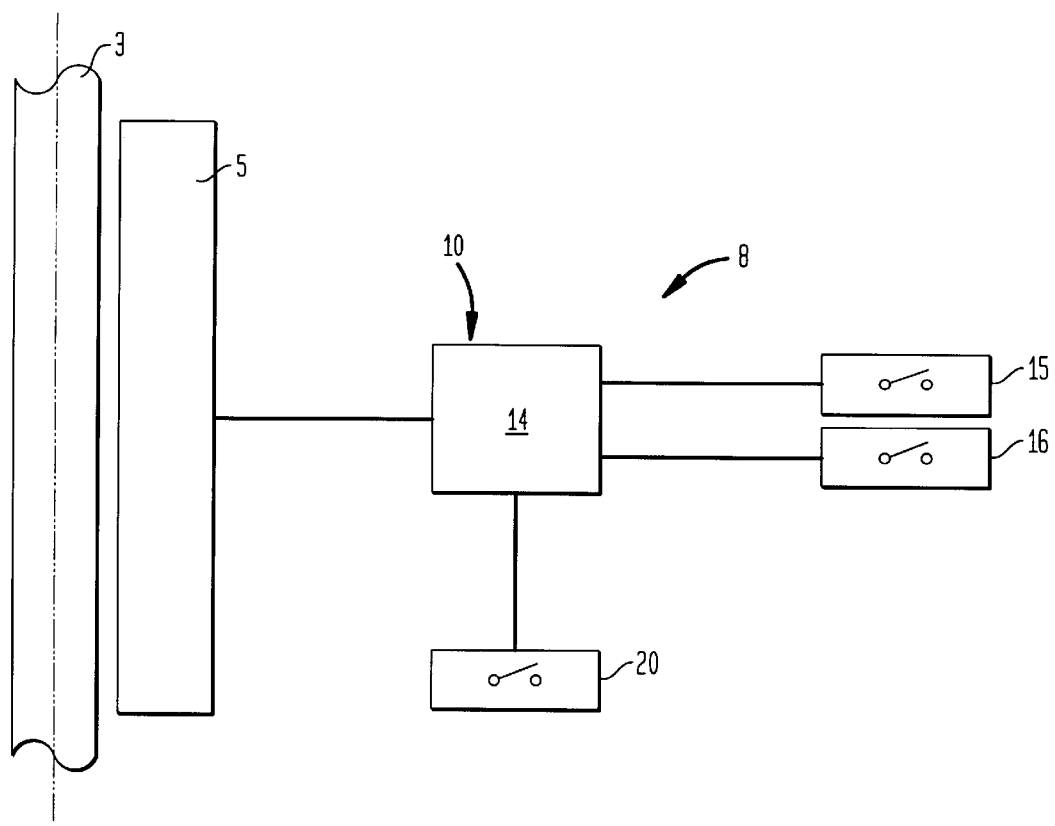
FIG. 2 shows a schematic block diagram for illustrating the essential components and functions of the position indicating apparatus of FIG. 1.

FIG. 2 shows a block diagram of the relevant components of the freely programmable position indicating apparatus 8 according to the invention. The position detection unit 5, for example in the form of a linear potentiometer, detects the respective position of the adjusting member 3 and generates commensurate analog output signals which are transmitted to the microprocessor 14 of the electronic evaluation unit 10. If necessary, a calibration unit 20 is associated to the microprocessor 14. In the nonlimiting example of FIG. 2, two switching relays 15, 16 are connected with the output of the microprocessor 14 for activating the valve (not shown) in response to the signals received from the evaluation unit 10.

Persons skilled in the art will understand that the position detection unit 5 may be formed by different types of potentiometers, such as e.g. a foil potentiometer. It is also possible to detect a rotational movement or a swinging movement via a rotary potentiometer in order to use a position indication apparatus according to the present invention in conjunction with swivel drives. It is further within the scope of the invention to so modify the electronic evaluation unit 10 that further influencing variables can be considered for programming the position indicating apparatus 8. Moreover, the light-emitting diode arrangement 12 may be replaced by other suitable displays for indicating the operational state.

While the invention has been illustrated and described as embodied in a freely programmable position indicating apparatus, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A freely programmable position indicating apparatus, in particular for valves, comprising:

an adjusting member;

a position detection unit operatively connected to the adjusting member for continuously generating an analog output signal commensurate with a position of the adjusting member, said position detection unit having self-learning capability for automatically recognizing and storing end positions of the adjusting member during a programming phase and exploiting the end positions as switching thresholds; and an electronic evaluation unit receiving the output signal for determining the position indication, said evaluation unit including a microswitch which, when actuated, initiates the programming phase of the position detection unit.

2. The apparatus of claim 1 wherein the adjusting member is movable along a travel path, said position detection unit extending along the entire travel path.

3. The apparatus of claim 1 wherein the position detection unit generates an analog output signal which is proportional to a movement of the adjusting member.

4. The apparatus of claim 1 wherein the position detection unit is formed by a linear potentiometer.

5. The apparatus of claim 1 wherein the position detection unit is formed by a rotary potentiometer.

6. The apparatus of claim 1 wherein the position detection unit is formed by a printed circuit board with ohmic layer resistivity.

7. The apparatus of claim 1 wherein the evaluation unit includes a microprocessor for storing information commensurate with the end positions, said microswitch operatively connected to the microprocessor.

8. The apparatus of claim 1 wherein the evaluation unit includes a light-emitting diode arrangement as a device for indicating an operational state.

9. The apparatus of claim 1 wherein the evaluation unit has an output, and further comprising at least one relay operatively connected to the output of the evaluation unit and activated by the evaluation unit.

10. The apparatus of claim 1 for monitoring the movement of the adjustment member for a valve, said adjustment member being formed by an actuating spindle which is in forced engagement with a drive piston.

11. The apparatus of claim 10 wherein the evaluation unit has an output, and further comprising at least two switching relays for activation of the valve.

12. The apparatus of claim 1, and further comprising protection means for screening the apparatus from environmental impacts.

* * * * *